United States Patent [19]

Satoh et al.

[11] 4,424,588

[45] Jan. 3, 1984

[54] METHOD FOR DETECTING THE POSITION OF A SYMMETRICAL ARTICLE

[75] Inventors: Takashi Satoh, Kawasaki; Isamu Shimada, Yokohama, both of Japan

[73] Assignee: Fujitsu Limited, Kanagawa, Japan

[21] Appl. No.: 296,310

[22] Filed: Aug. 26, 1981

[30] Foreign Application Priority Data

Aug. 29, 1980 [JP] Japan ................. 55-119082

[51] Int. Cl.³ .................................... H04N 7/18
[52] U.S. Cl. ................................. 382/48; 358/107; 364/516
[58] Field of Search ................. 382/48; 358/125, 126, 358/107; 364/516

[56] References Cited

U.S. PATENT DOCUMENTS

| 3,903,361 | 9/1975 | Alpers ................. | 358/125 |
| 4,004,083 | 1/1977 | Norem ................. | 358/125 |
| 4,163,212 | 7/1979 | Buerger ................ | 382/48 |
| 4,334,241 | 6/1982 | Kashioka ............... | 382/48 |

Primary Examiner—Howard Britton
Attorney, Agent, or Firm—Staas & Halsey

[57] ABSTRACT

Disclosed is a method of detecting the position of a symmetrical article by converting image signals of the article into binary information and detecting the position of the article based on the binary information. A first median point is determined, from the binary information, that is between two points of intersection between a first straight line intersecting the article and the sides of the article. A second median point is determined, from the binary information, that is between two points of intersection between a second straight line passing through the first median point, crossing the first straight line at right angles and crossing the sides of the article. Sequentially, 3rd to (n−1)th median points are similarly determined from the binary information, and finally, an n'th median point is determined from the binary information, that is between two points of intersection between an n'th straight line passing through the preceding (n−1)th median point, crossing the preceding (n−1)th straight line at right angles and the sides of the article. The position of the symmetrical article is detected by using the n'th median point as the central point of the article.

4 Claims, 33 Drawing Figures

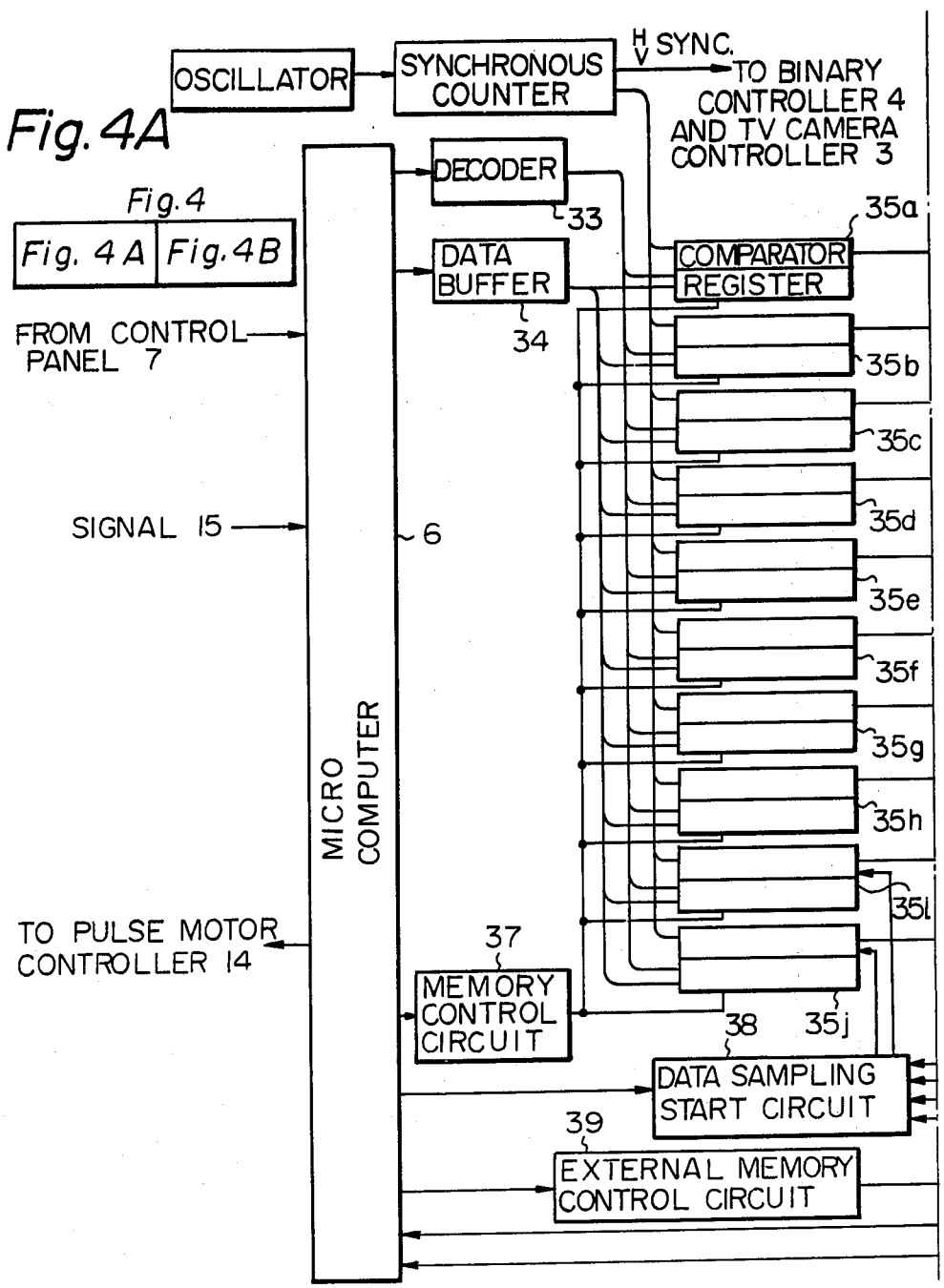

H (HORIZONTAL)

V (VERTICAL)

DATA SAMPLING REGION (LESS THAN 1 H)

DATA SAMPLING REGION (1H × 3b)

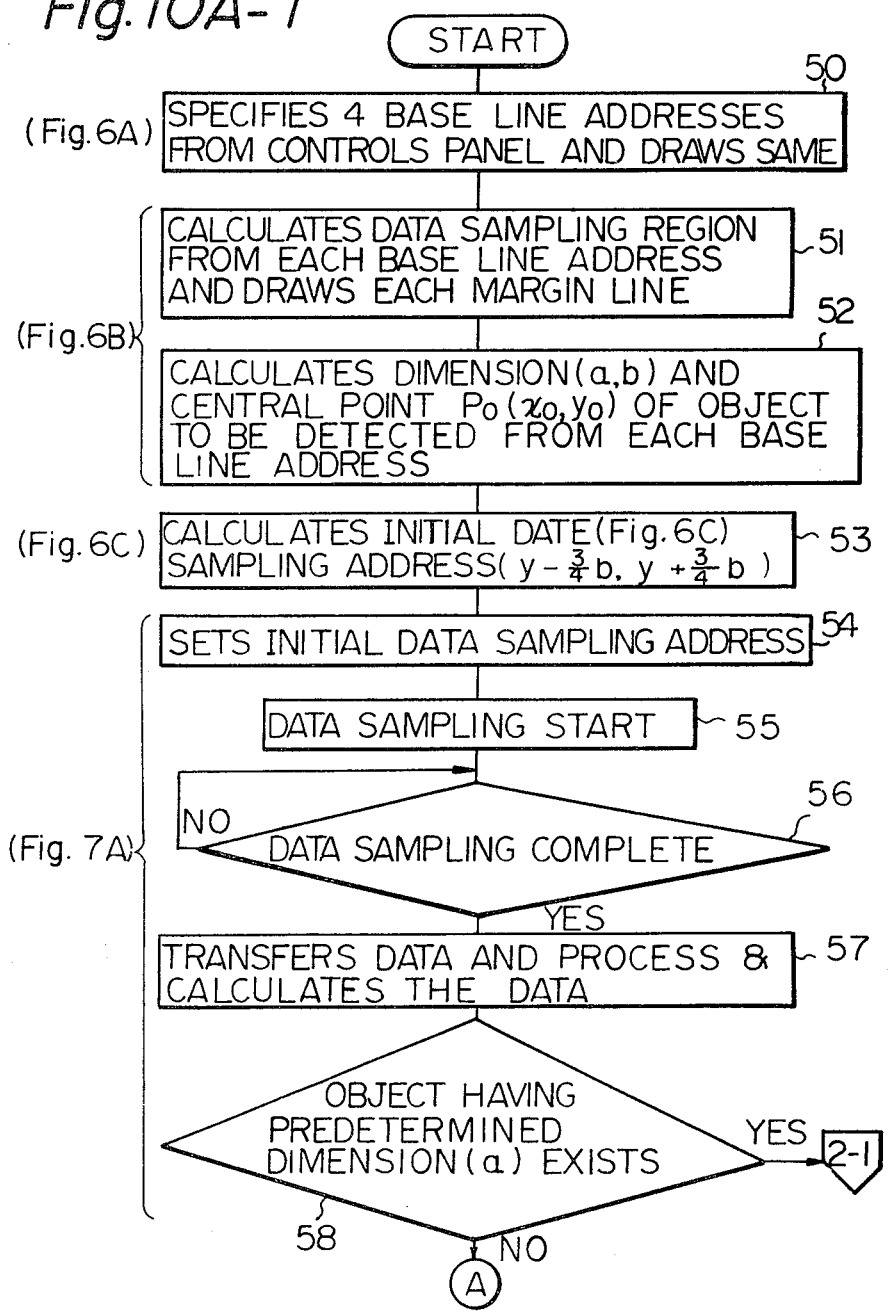

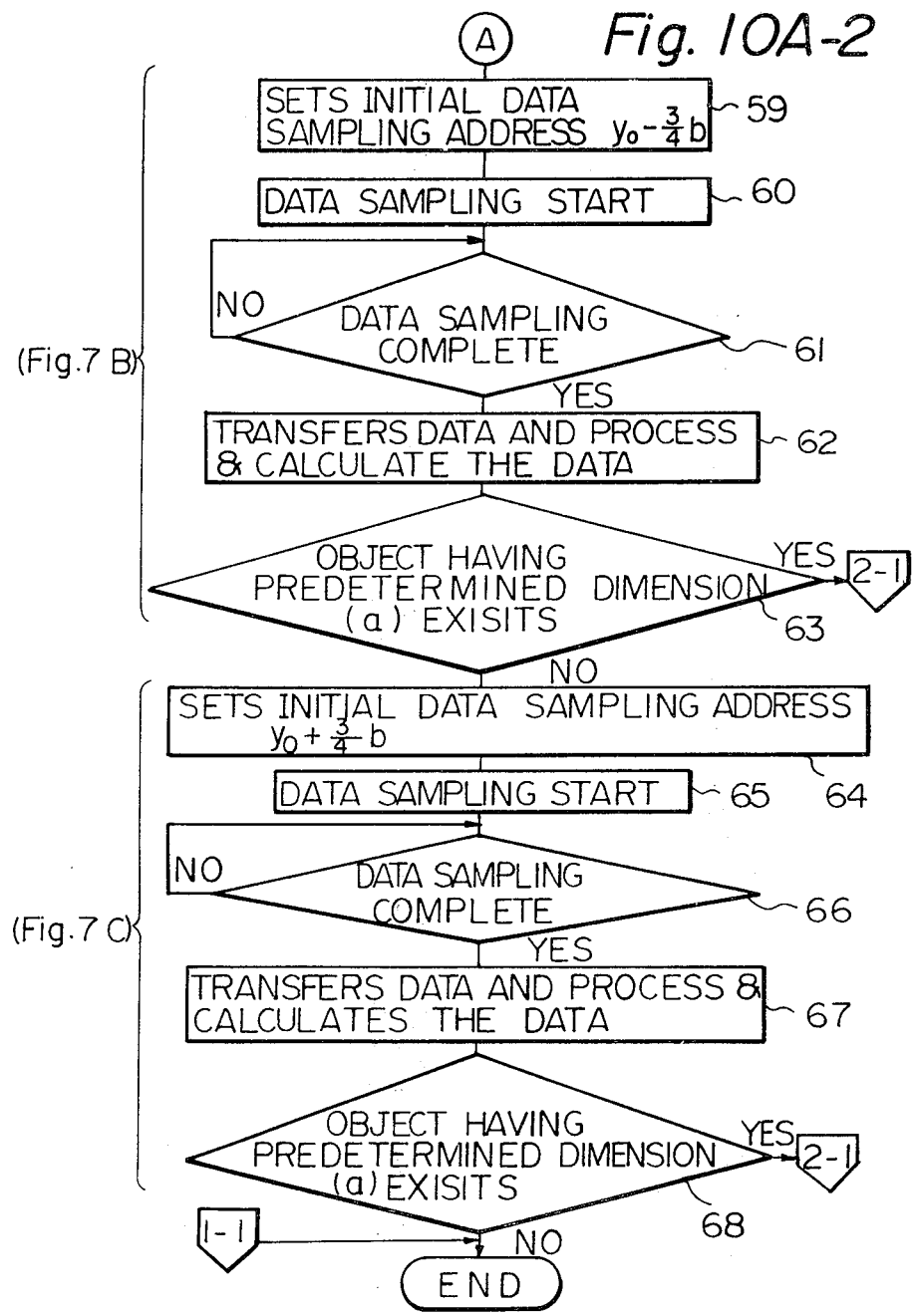

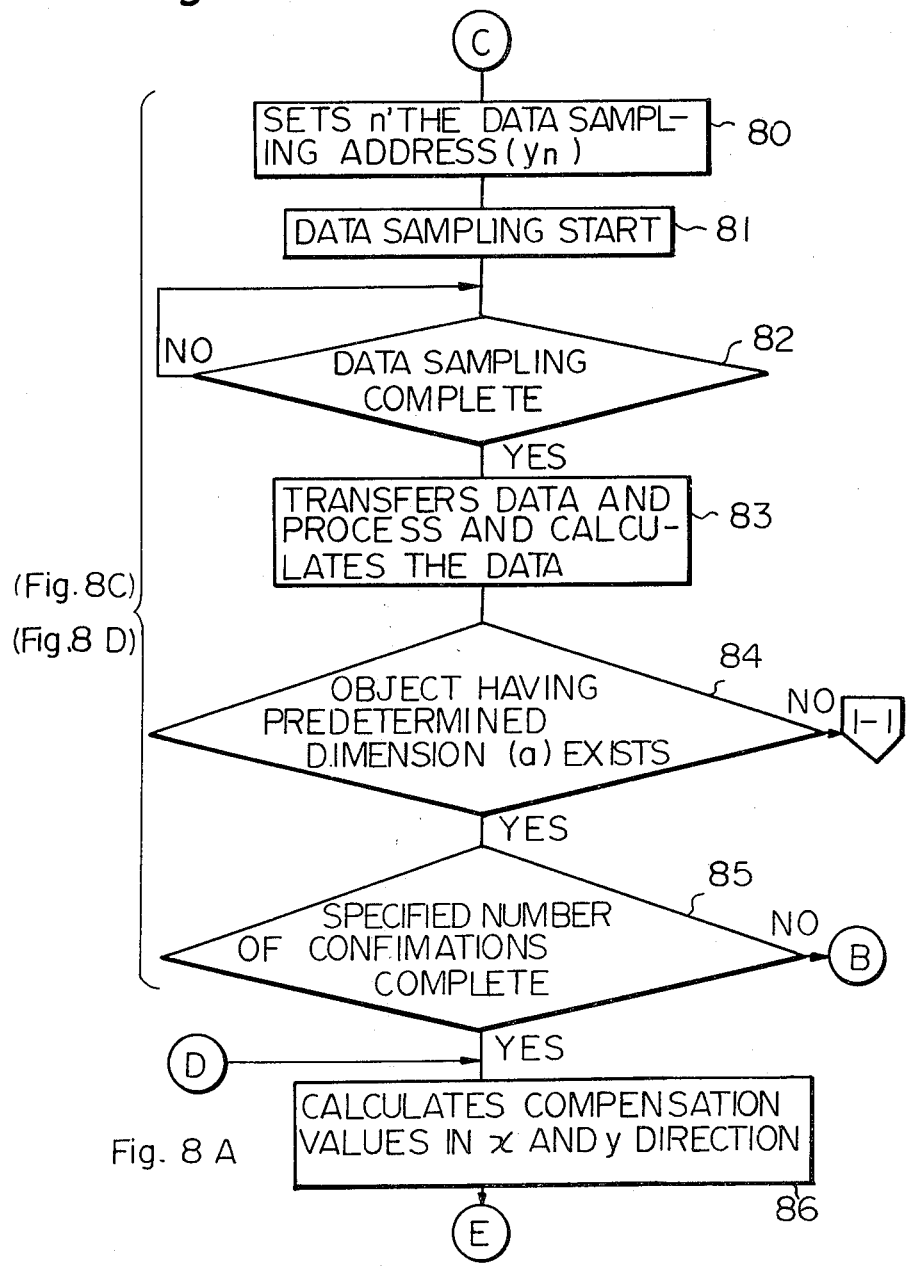

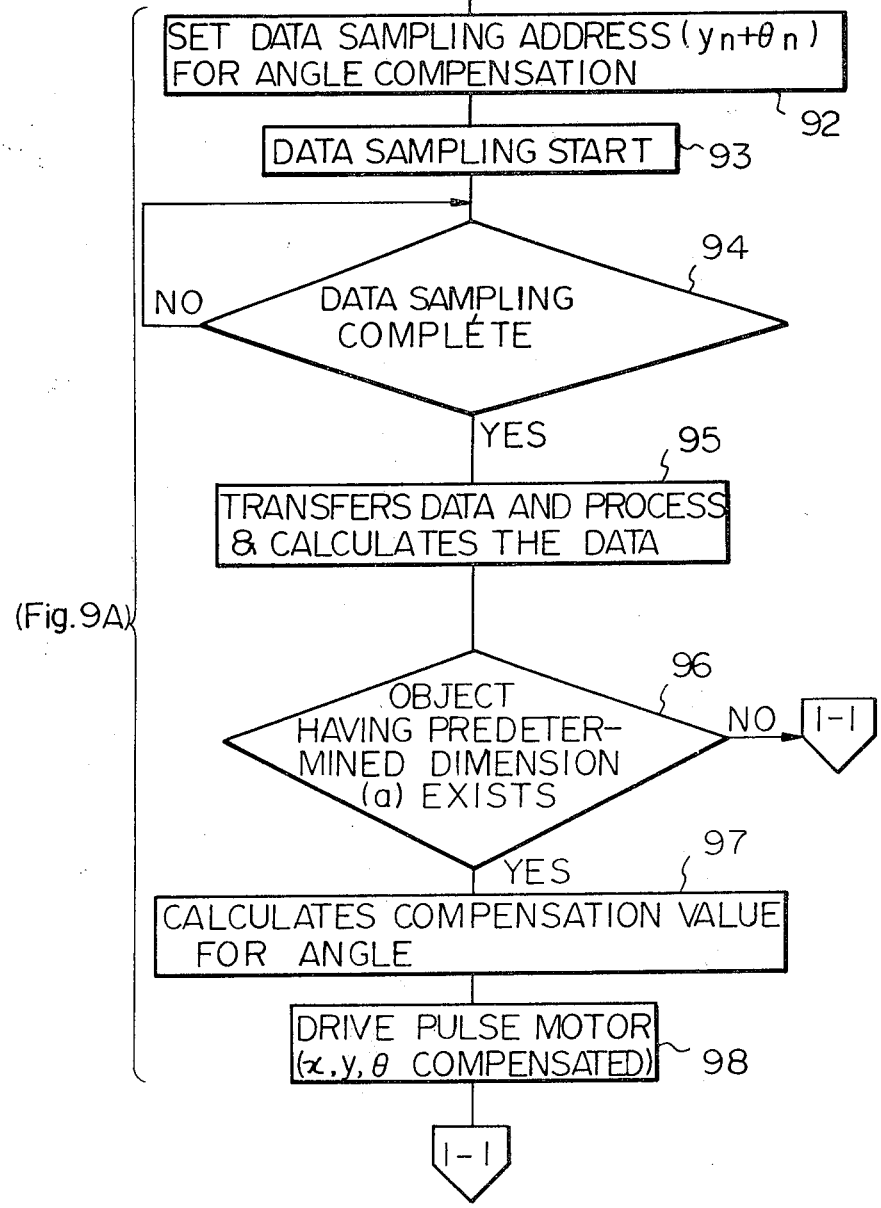

METHOD FOR DETECTING THE POSITION OF A SYMMETRICAL ARTICLE

FIELD OF THE INVENTION

The present invention relates to a method for detecting the position of a symmetric article. More particularly, the present invention relates to a method for detecting the position of a symmetrical article, which comprises converting image signals from a TV camera or other image sensor into binary information and processing the binary information by a micro-computer, whereby position correction values in the directions X, Y and $\theta$ can be detected at high speeds.

BACKGROUND OF THE INVENTION

Method for registration of an article symmetrical with respect to directions X and Y, such as an IC chip, by sucking up such a symmetric article with a die collet, have heretofore been adopted. In one method, one longitudinal edge and one lateral edge of the article are detected by a TV camera or an image sensor; in another method, in the entire surface of the article region including one corner is read out. However, these methods are insufficient. For example, the former method is defective in that detection is effected irrespective of the size of the article and registration is biased in the allowable range of the dimensions of the article. Furthermore, the latter method is defective in that since the entire surface is read out, a long time is required for reading and processing the data.

SUMMARY OF THE INVENTION

It an object of the present invention to provide a method for detecting the position of a symmetrical article in which a central position and rotational position of the symmetrical article are detected at high speeds while reducing the number of scanning lines.

In accordance with the present invention, there is provided a method for detecting the position of a symmetrical article by converting image signals of the article to binary information and detecting the position of the article based on said binary information. The position detection comprises determining a first median point from binary information corresponding to two points of intersection between a first straight line intersecting said article and the side of the article and then determining a second median point from binary information corresponding to two points of intersection between a second straight line passing through said first median point and crossing said first straight line at right angles and the side of said article. Then sequentially determining an n'th median point from binary information corresponding to two points of intersection between an n'th straight line passing through the preceding (n−1)th median point and crossing the preceding (n−1)th straight line at right angles and the side of said article, and performing the detection of the position of the article by using said n'th median point as the central point of the article.

Further features and advantages of the present invention will be apparent from the ensuing description with reference to the accompanying drawings to which, however, the scope of the invention is in no way limited.

BRIEF DESCRIPTION OF THE DRAWINGS

FIGS. 10A-1, 10A-2, 10B-1, 10B-2, 10B-3 and 10C are flow charts embodying the methods illustrated in FIGS. 6A through 6F, FIGS. 7A through 7F and FIGS. 8A and 8B, respectively;

DETAILED DESCRIPTION OF THE PREFERRED EMBODIMENTS

Figure 1:
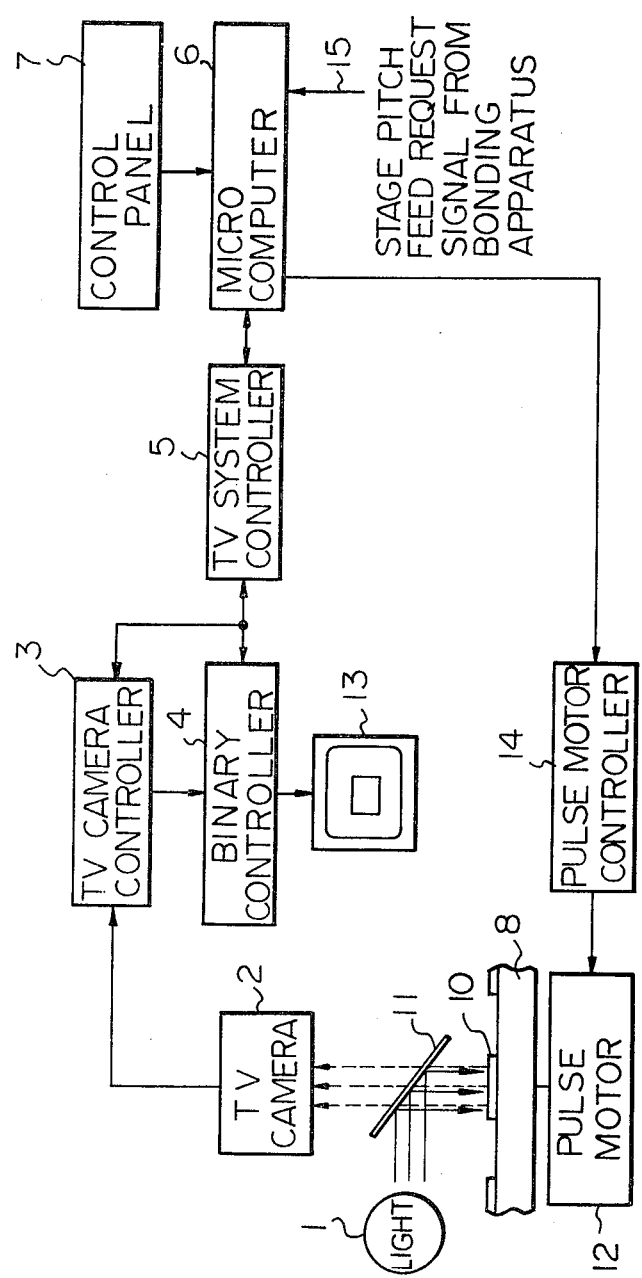
FIG. 1 is a diagram illustrating a structure of an automatic die bonder to which the present invention is applied.
Figure 2:
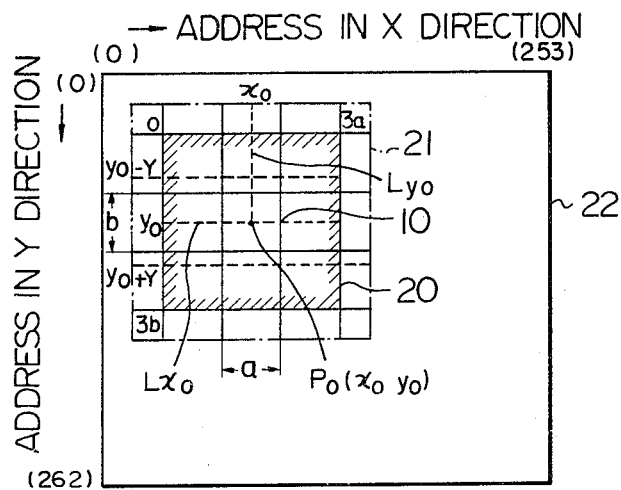
FIG. 2 is a diagram illustrating the relationship between an IC chip as a symmetric article and a data sampling region.

FIG. 1 illustrates one embodiment of the present invention, in which the present invention is applied to an automatic die bonder. A light source 1 is disposed to illuminate an IC chip 10 on a registration stage 8 and a half mirror 11 is disposed to guide the reflected light to a data-detecting TV camera 2. A pulse motor 12 is disposed to move the stage 8 horizontally in the directions X and Y and to rotate the stage 8 on the plane X-Y in the direction $\theta$ as illustrated in FIG. 2. Although an image pickup vision field of the TV camera 2 is broad, an data sampling region to be used for registration is limited to an area which is an integral number of times as large as the area of the IC chip 10.

An example of the data sampling region is illustrated in FIG. 2. More specifically, FIG. 2 illustrates the mutual relationship among the IC chip 10, the illuminated region 20, i.e., the data sampling region 20, a margin region 21 for the illuminating region 20 and the image pickup region 22 of the TV camera. Referring to FIG. 2, lengths of longitudinal and lateral sides of the data sampling region 20 are limited to three times the longitudinal and lateral sides b and a of the chip 10, respectively.

Figure 3:
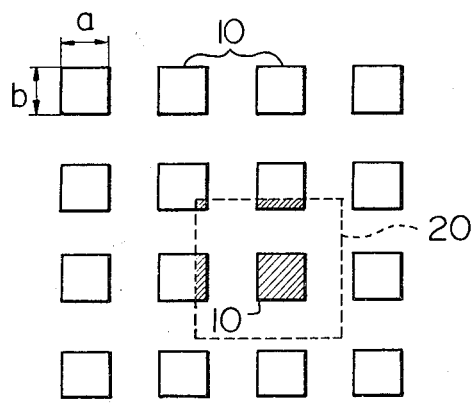
FIG. 3 is a diagram illustrating an arrangement of IC chips on a registration stage shown in FIG. 1.

FIG. 3 is a diagram illustrating an arrangement of chips on the stage 8. This arrangement is constructed by scribing a wafer, applying a stretchable film onto the wafer, cracking the wafer and stretching the film.

The TV camera 2 in FIG. 1 is controlled by a TV camera controller 3, and an output image signal (analog wave form) is converted to binary information by a binary controller (video slicer) 4 and is displayed on a TV monitor 13 and simultaneously stored in an external memory within a TV system controller 5. A microcomputer 6 is disposed to appoint an address for writing of the binary information and perform various processings described hereinafter. Reference numerals 7 and 14 represent a control panel (console) and a controller for driving the pulse motor 12, respectively.

Figure 4B:
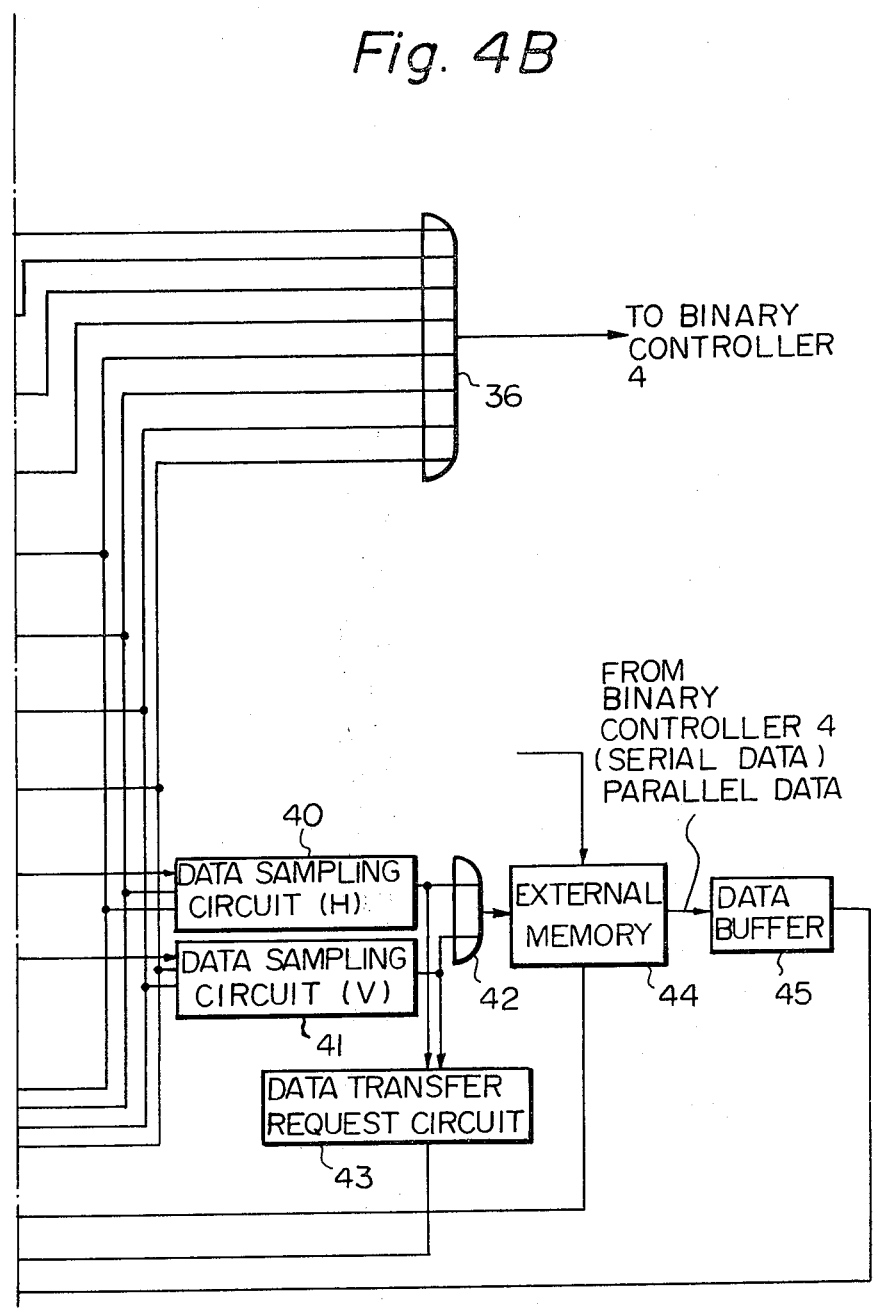
FIG. 4 comprising 4A and 4B is a block diagram illustrating in detail a television system controller in the structure shown in FIG. 1.

FIG. 4 is a block diagram illustrating in detail the TV system controller 5 shown in FIG. 1. Referring to FIG. 4, an oscillator 31 supplies horizontal and vertical synchronous signals to the bindary controller 4 and television camera controller 3 through a synchronous counter circuit 32. Information about a base line, margin line and sampling address are stored in register sections of comparator registers $35a \sim 35d$, $35e \sim 35h$, $35i$ and $35j$ through a data buffer 34 from the micro-computer 6 by the command of the decoder 33. The stored information is compared with the output of the synchronous counter circuit 32 and when they are coincident with each other, the coincident signal is supplied to the binary controller 4 through a gate 36, and the base line and the margin line are displayed in the monitor 13. The outputs of the comparator register $35e$ through $35h$, that is, the outputs of margin lines $X_1$, $X_2$, $Y_1$ and $Y_2$, are supplied to the comparator section of the comparator registers $35i$ and $35j$ through a data sampling starting circuit 38 so as to control the data sampling circuits 40 and 41, and the output of the comparator sections of the comparator registors $35i$ and $35j$ (data samplying circuit start signals) are placed in an off state. The outputs of the data sampling circuits 40 and 41 (data sampling start signal) are supplied via a gate 42 to an external memory 44. The external memory 44 stores the serial data of the data sampling address from the binary controller 4. At the same time, a data transfer demand is transmitted to the micro-computer 6 from a data transfer request circuit 43. In accordance with this data transfer demand, an external memory control circuit start signal is supplied from the micro-computer 6 to the external memory control circuit 39, the external memory control circuit 39 converts the data in the external memory into a parallel data, and the converted parallel data is transmitted via the data buffer 45 to the micro-computer 6.

Figure 5A:
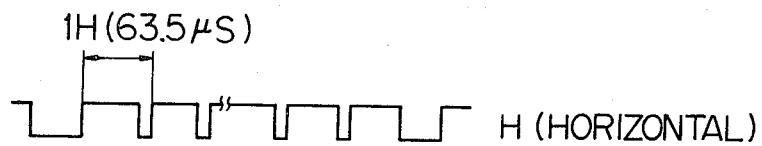
FIGS. 5A, 5B, 5C and 5D are wave form charts of outputs of a television camera shown in FIG. 1.
Figure 5B:
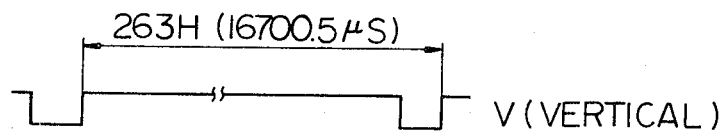
Figure 5C:
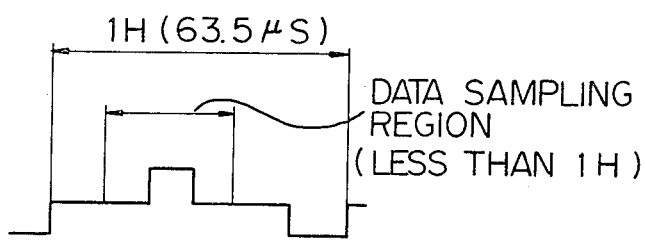
Figure 5D:
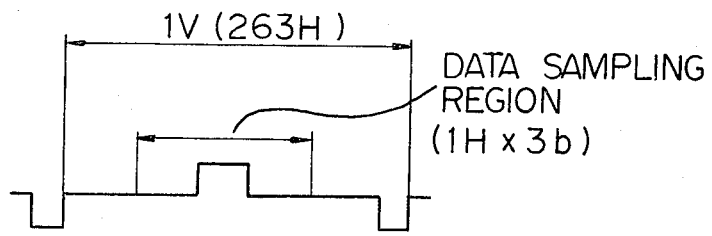

FIGS. 5A and 5B are wave form diagrams illustrating horizontal and vertical synchronous signals of the TV camera 2, and FIGS. 5C and 5D are wave form diagrams illustrating the relation between one line (horizontal and vertical) of the binary image signal and the data sampling region. The time for transmitting one picture scene of the TV camera is to 1/60 second, and the time required for one data sampling is 63.5 μs for of the horizontal line and is 1 horizontal line (63.5 μs)×sample size (bits)×3 for of the vertical line. Accordingly, the remaining time can be utilized for data processing by the micro-computer 6 and appointment of a subsequent data sampling address. Since writing in the external memory is completed within one horizontal line (63.5 μs), and 262 horizontal lines (16637.5 μs) are left before output of the subsequent picture scene. If during the period of 262 horizontal lines, the micro-computer 6 performs data processing and outputs a subsequent data sampling address $x_n$ to the TV controller 3, one detection is possible for one picture scene (about 1/60 second for one processing). This operation is relative to the horizontal direction shown in FIG. 5C. In connection with the vertical direction shown in FIG. 5D, since 1 horizontal line is required for writing the data of one bit, data reading is effected by the micro-computer 6 at intervals of 8 horizontal lines. Therefore, 1 horizontal line×3 b are necessary for reading of all the data of the data sampling region. However, since [1 vertical line (263 horizontal lines)−1 horizontal line×3 b] are left before output of the subsequent picture scene, if during this period, the micro-computer 6 performs data processing and outputs a subsequent data sampling address $y_m$ to the TV controller 3, one detection is possible for one picture scene (1/60 second for one processing). Accordingly, detection processing of one line is completed within 1/60 second. The maximum processing time for detection of correction values in the directions X, Y and θ is 10/60 second (minimum process time=8.60 second) because the time for detection of correction values of X and Y is 8/60 seconds (minimum detection time=6/60 second) and the time for detection of the correction value of the angle is 2/60 second if confirmation of the first sample is effected 3 times. The so obtained correction values of X, Y and θ are transmitted to the controller 14 to effect registration.

The registration methods of the present invention illustrated in FIGS. 6A through 6C, FIGS. 7A through 7C, FIGS. 8A through 8F and FIGS. 9A and 9B will now be described with reference to flow charts of FIGS. 10A through 10C.

Figure 6A:
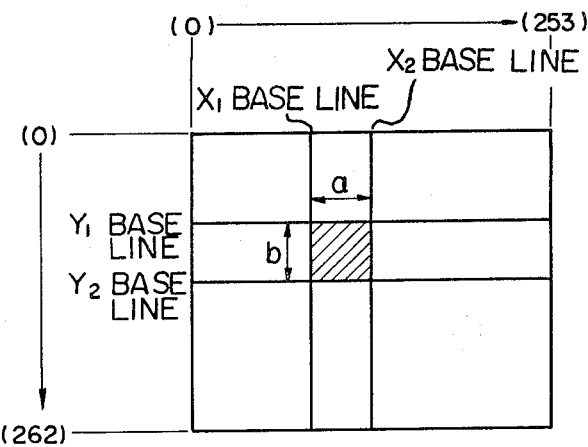
FIGS. 6A, 6B and 6C and 7A, 7B and 7C are diagrams illustrating a method of detecting the presence or absence of a symmetric article.
Figure 6B:
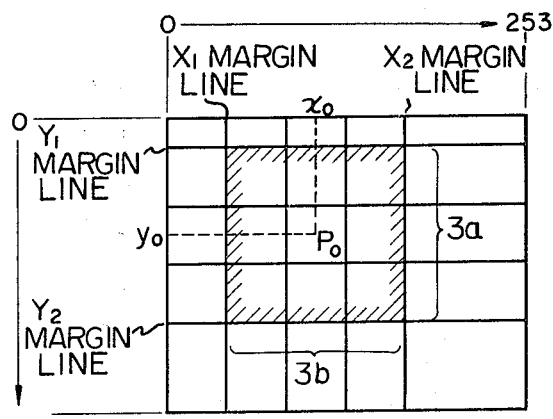
Figure 6C:
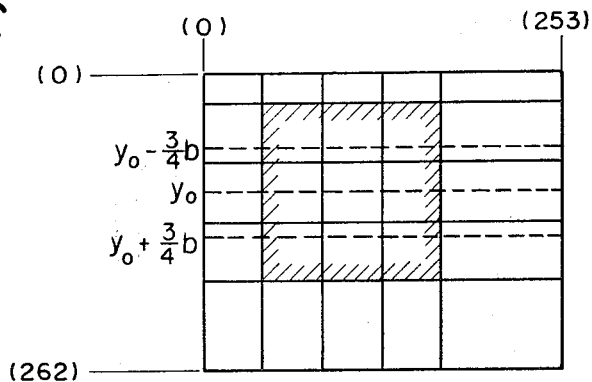

As shown in FIG. 6A, four base line addresses are appointed and drawn out by the control panel (block 50 in FIG. 10A), and as shown in FIG. 6B, the data sampling region is calculated from each base line address, and each margin line and central point thereof are drawn out (blocks 51 and 52 in FIG. 10A). Then, as shown in FIG. 6C, the sampling addresses $y_o - \frac{3}{4}b$, $y_o$ and $y_o + \frac{3}{4}b$ of initial data are calculated (block 53 of FIG. 10A).

Base lines (known dimensions a, b) for effecting registration as shown in FIG. 2 are displayed on the monitor 13. The cross point $P_o$ of the lines $L_{xo}$ and $L_{yo}$ is designated as $x_o$ and $y_o$.

Figure 7A:
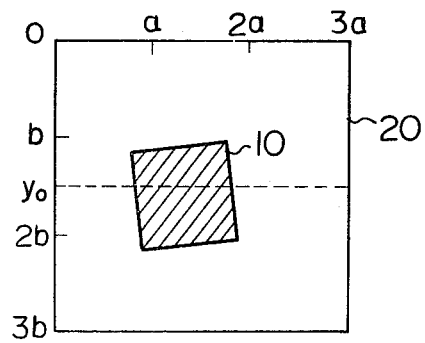

(1) First, the data at the address $y_o$ is sampled to detect the presence or absence of the article having the known dimensions. This state is illustrated in FIG. 7A and the process (1) is indicated by blocks 54 through 58 in FIG. 10A.

Figure 7B:
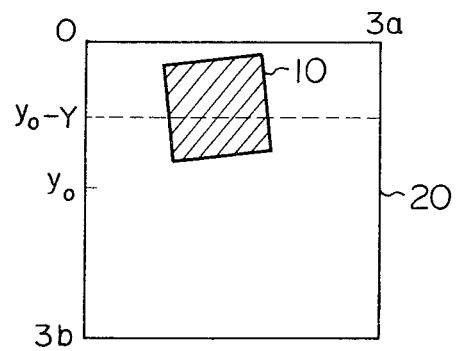

(2) Then, if the article is not detected in the process (1), the address section $y_o - Y$ is sampled as shown in FIG. 7B, and detection is carried out in the same manner as in the process (1). Incidentally, Y is adjusted to 3b/4, i.e., ¾ of the known longitudinal size b of the article. This process (2) is indicated by blocks 59 through 63 in FIG. 10A.

Figure 7C:
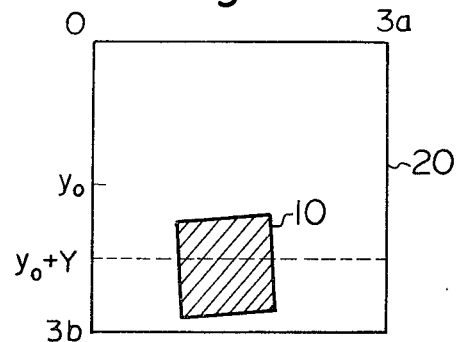

(3) If the article is not detected by the process (2), the address section $y_o + Y$ is sampled as shown in FIG. 7C, and detection is carried out in the same manner as in the process (1). This process (3) is indicated by blocks 64 through 68 in FIG. 10A.

(4) If the article is not detected at any of $y_o$, $y_o - Y$ and $y_o + Y$, it is determined that the intended article is not present in the data sampling region 20. (The time required for the foregoing processings is 3/60 second.)

(5) If the article 10 is detected in any of the foregoing processes (1) through (3), the following processings are carried out.

Figure 8A:
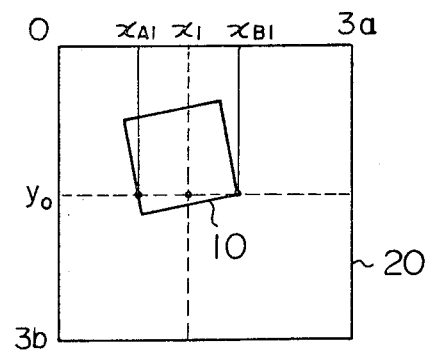
FIGS. 8A, 8B, 8C, 8D, 8E and 8F are diagrams illustrating a method of detecting the central position of a symmetrical article.

The center between the left and right edges is determined. The address of this center is designated as $x_1$. FIG. 8A shows the case where the article 10 is detected at the address $y_o$. In this case, the following relationship is established:

$$x_1 = (x_{A1} + x_{B1})/2$$

Figure 8B:
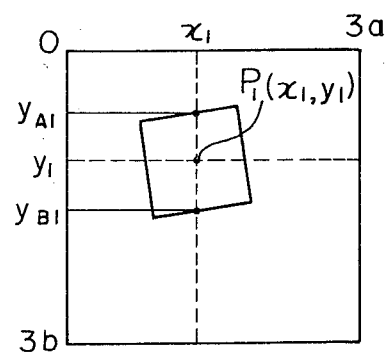

The data at the address $x_1$ for the center in the vertical direction are sampled, and the presence or absence of the article having the known dimensions is detected. If the presence of the article is confirmed, the center between the upper and lower edges is determined as shown in FIG. 8B. If the address of this center is designated as follows:

$$y_1 = (y_{A1} + y_{B1})/2.$$

After detection of the address $y_1$, the data of the address $y_1$ in the horizontal direction is sampled to confirm the presence or absence of the article having the known dimensions. If the foregoing processings are repeated a certain number of times, the difference between the point $P_1$ and the intended point $P_o$ $(x_o, y_o)$, that is, $(x_o - x_n)$ and $(y_o - y_n)$, is detected.

FIGS. 8C through 8F show processings of from the first median point $P_1$ $(x_1, y_1)$ to the n'th (n=3) median point $P_3$ $(x_3, y_3)$, and $x_2$, $y_2$, $x_3$ and $y_3$ are expressed as follows:

$$x_2 = (x_{A2} + x_{B2})/2, \; y_2 = (y_{A2} + y_{B2})/2,$$

$$x_3 = (x_{A3} + x_{B3})/2 \text{ and } y_3 = (y_{A3} + y_{B3})/2$$

Figure 8C:
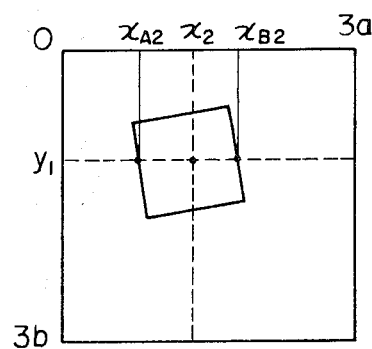
Figure 8D:
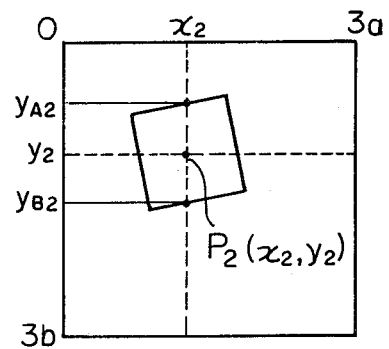
Figure 8E:
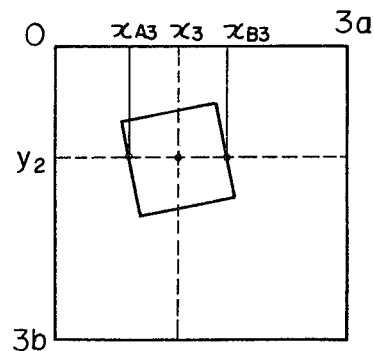
Figure 8F:
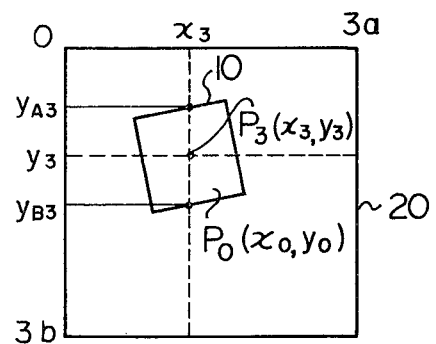
Figures 1, 10B:
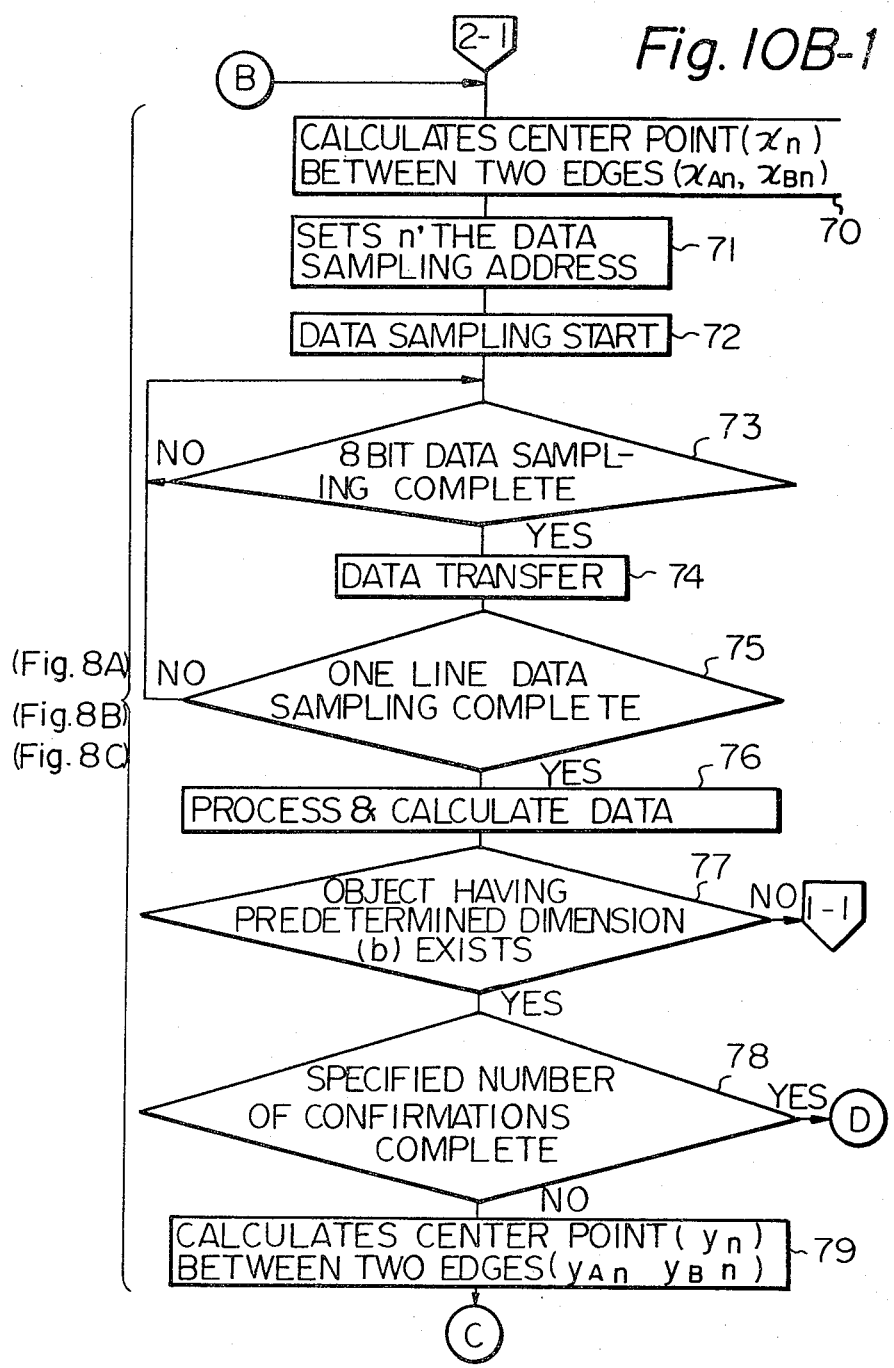
Figures 3, 10B:
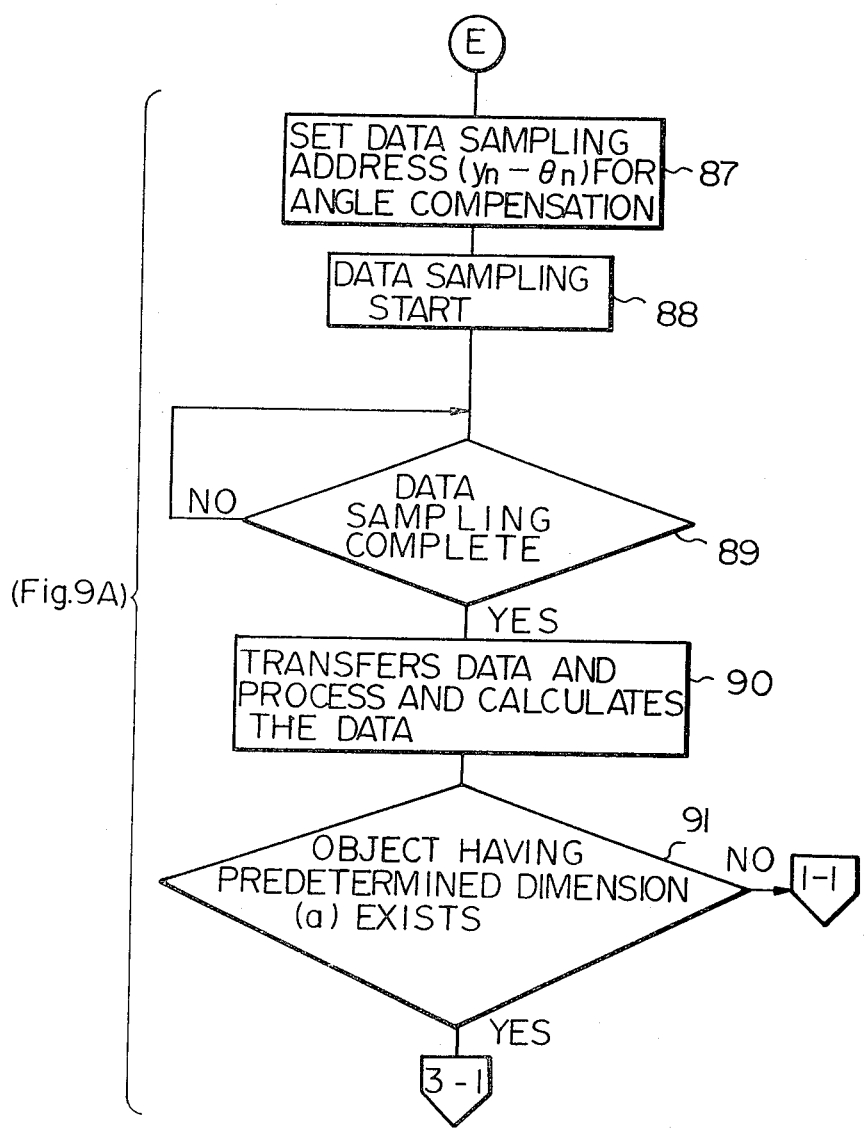

In the flow chart of FIG. 10B, blocks 70 through 79 correspond to the process shown in FIGS. 8A, 8B and 8E, blocks 80 through 85 correspond to the process shown in FIGS. 8C and 8D, and the block 86 corresponds to the process shown in FIG. 8F.

Incidentally, the coordinates $(x_3, y_3)$ of the third median point are not strictly coincident with the coordinates of the center of the article 10. However, since the first median point $P_1$, second median point $P_2$, third median point $P_3$, . . . , n'th median point $P_n$ gradually come closer to the true median point, even if the third median point $P_3$ is regarded as the actual median point, no particular trouble or damaging error is caused about. If the above-mentioned difference in information $(x_o - x_n)$ and $y_o - y_n$ are fed to the controller 14 shown in FIG. 1, the stage 8 is horizontally moved in the directions X and Y, and the median point $P_3$ of the chip 10 becomes coincident with the center $P_o$ of the data sampling region 20.

Figure 9A:
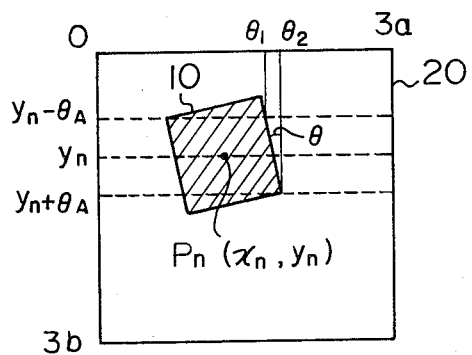
FIGS. 9A and 9B are diagrams illustrating a method of detecting the rotational position of a symmetrical article.
Figure 9B:
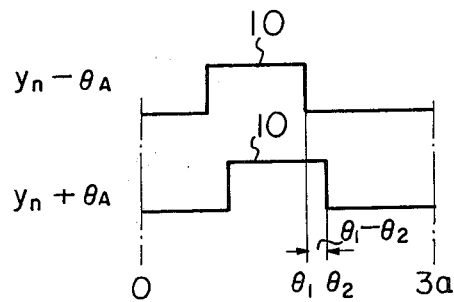

If the addresses $\pm \theta_A$, i.e., $y_n - \theta_A$ and $y_n + \theta_A$, are used for detection of the edges of the article 10 with the n'th median point $P_n$ being as the center as shown in FIG. 9A, a correction quantity for the angle can be calculated from the differences between the two addresses, that is, $2\theta_A$ and $\theta_1 - \theta_2$. FIG. 9B is a wave form diagram of binary data read out from the addresses $y_n - \theta_A$ and $y_n + \theta_A$, and the phase difference at the rear edge is $\theta_1 - \theta_2$. If the stage 8 is rotated based on this correction quantity.

$$\theta = \tan\left(-1 \frac{\theta_1 - \theta_2}{2\theta_A}\right),$$

the chip 10 is correctly registered in the central portion of the region 20 with respect to the rotation position.

The process for calculation of the angular correction quantity of the article is indicated by blocks 87 through 89 of FIGS. 10b and 10C.

Figure 11A:
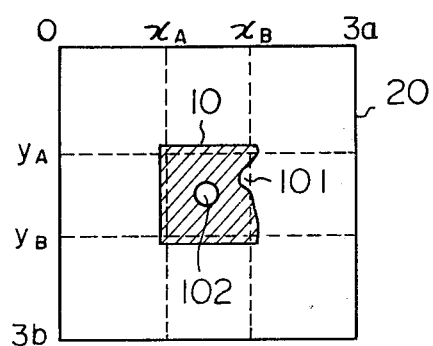
FIGS. 11A and 11B are diagrams illustrating a method of detecting a broken section of a symmetrical article.
Figure 11B:
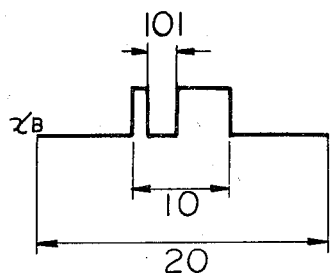
Figure 12A:
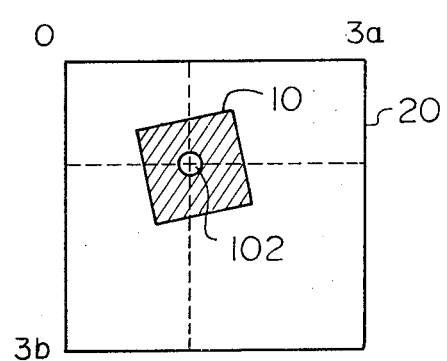
FIGS. 12A and 12B are diagrams illustrating a method of detecting a no-good mark on an IC chip.
Figure 12B:
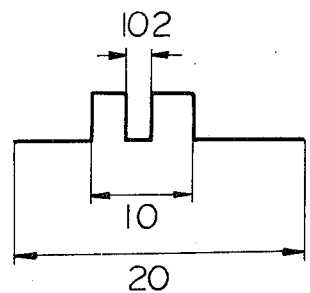

If addresses $x_A$, $x_B$, $y_A$ and $y_B$ of four points located on the inner side by predetermined widths from the edges of the article are sampled as shown in FIG. 11A, a wave form indicating a broken section 101 as shown in FIG. 11B is obtained, and the article is checked as the defective article having no predetermined dimensions. Furthermore, if a "no-good" mark 102 is detected as shown in FIG. 12A, the output wave form obtained is as shown in FIG. 12B. Therefore, the article is similarly checked as the defective article. When any article is not detected in the process shown in FIGS. 7 through 7C, the stage 8 is forwarded or advanced by one pitch in a predetermined direction. If a plurality of chips 10 are present in the data sampling region 20 as shown in FIG. 3, among these articles, only the article having the known dimensions a and b is regarded as the chip 10 and the preceding processings are carried out on this chip 10.

In the die bonder, since the chip interval on the stage 8 is limited (there is a stretching limit of the film), it is necessary to perform high-precision registration because of the shape of a die collet, but wasting a long time for such processing is disadvantageous. According to the present invention, however, high-precision registration can be performed by applying a small number of scanning lines to a limited data sampling region used for sampling of data, and therefore, the processing time can remarkably be shortened. Furthermore, the present invention is advantageous in that by such processing, a defective article can be checked according to need.

The present invention has been described with reference to the embodiment where the present invention is applied to an automatic die bonder. If the magnifying power of the lens of the TV camera head or image sensor head is appropriately changed, the present invention can be utilized for detecting the positions of various symmetrical articles irrespectively of the dimensions thereof.

We claim:

1. A method of detecting the position of a symmetrical article by converting image signals of the article into binary information and detecting with a computer a central position of the article based on said binary information, said method comprising the steps of:
   determining a first median point, from said binary information, between two points of intersection of a first straight line intersecting said article and the sides of said article;
   determining a second median point, from said binary information, between two points of intersection between a second straight line and the sides of said article, said second straight line passing through said first median point and crossing said first straight line at right angles;
   sequentially determining an n'th median point, from said binary information, between two points of intersection between an n'th straight line and the sides of said article, said n'th straight line passing through the preceding (n−1)th median point and crossing the preceding (n−1)th straight line at right angles, where n is an integer greater than or equal to 3; and
   performing the detection of the position of the article by using said n'th median point as the central position of the article.

2. A method of detecting the position of a symmetrical article according to claim 1, wherein a rotational position of said article is detected from said binary information concerning coordinates of the points of intersection between each of two parallel scanning lines both intersecting one side of said article.

3. A method of detecting a central position of a symmetrical article on a stage, comprising:
   (a) scanning the stage in a first direction;
   (b) detecting the presence of the symmetrical article and generating a first article scan line;
   (c) determining a first midpoint of the first article scan line;
   (d) scanning the stage and the article in a second direction perpendicular to the first direction, where the scan passes through the first midpoint, and generating a second article scan line;
   (e) determining a second midpoint of the second article scan line;
   (f) scanning the stage and the article in an Nth direction perpendicular to the N−1th direction, where the scan passes through the N−1th midpoint, and generating an Nth article scan line, where N is an integer greater than or equal to 3; and
   (g) determining an Nth midpoint of the Nth article scan line, so that the Nth midpoint is the central position of the article.

4. A method of detecting a central position of a symmetrical article on a stage according to claim 3, further comprising:
   (h) scanning the stage and the article in a N+1th direction parallel to the Nth direction and generating an N+1th article scan line y distance from the Nth scan line;
   (i) determining a first end point of the N+1th article scan line, where the N+1th article scan line intersects one side of the article;
   (j) scanning the stage and the article in an N+2th direction parallel to the Nth direction and generating an N+2th article scan line −y distance from the Nth scan line;
   (k) determining a second end point of the N+2th article scan line, where the N+2th article scan line intersects the one side of the article; and
   (l) determining an angle between the first and second end points, so that a rotational position of the symmetrical article is determined.

* * * * *

UNITED STATES PATENT AND TRADEMARK OFFICE
CERTIFICATE OF CORRECTION

PATENT NO. : 4,424,588
DATED : JANUARY 3, 1984
INVENTOR(S) : TAKASHI SATOH ET AL.

It is certified that error appears in the above-identified patent and that said Letters Patent is hereby corrected as shown below:

FRONT PAGE, [57] ABSTRACT
    line 15, "," should be --determined,--.

Col. 1, line 7, "symmetric" should be --symmetrical--;
    line 18, after "article" insert --which is--;
    line 20, "symmetric" should be --symmetrical--;
    line 35, after "It" insert --is--;
    line 38, after "and" insert --a--.

Col. 2, line 7, "symmetric" should be --symmetrical--;
    line 11, "Fig. 4" should be --Fig. 4,--; and "4B" should be --4B,--;
    line 18, "symmetric" should be --symmetrical--;
    line 47, "an" should be --a--;
    line 49, delete "as" (first occurrence); and "large as" should be --larger than--;
    line 54, "the" (second occurrence) should be --an--;
    line 58, "b and a" should be --$\underline{b}$ and $\underline{a}$--.

UNITED STATES PATENT AND TRADEMARK OFFICE
CERTIFICATE OF CORRECTION

PATENT NO. : 4,424,588
DATED : JANUARY 3, 1984
INVENTOR(S) : TAKASHI SATOH ET AL.

It is certified that error appears in the above-identified patent and that said Letters Patent is hereby corrected as shown below:

Col. 3, line 50, delete "of";
      line 52, delete "of".

Col. 5, line 39, delete "about";
      lines 55-60, "$\theta = \tan(-1$" should be
            --$\theta = \tan^{-1}($--.

Col. 6, line 16, "of" should be --for--;
      line 38, "in" should be --into--;
      line 39, delete "to".

Signed and Sealed this

Twelfth Day of June 1984

[SEAL]

*Attest:*

*Attesting Officer*

GERALD J. MOSSINGHOFF

*Commissioner of Patents and Trademarks*